(12) United States Patent
Fang et al.

(10) Patent No.: US 6,454,027 B1
(45) Date of Patent: Sep. 24, 2002

(54) POLYCRYSTALLINE DIAMOND CARBIDE COMPOSITES

(75) Inventors: Zhigang Fang; Anthony Griffo; Brian A. White, all of The Woodlands, TX (US); Stewart Middlemiss, Salt Lake City; Ron K. Eyre, Orem, both of UT (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/521,717

(22) Filed: Mar. 9, 2000

(51) Int. Cl.⁷ ............................................. E21B 10/46
(52) U.S. Cl. ................... 175/374; 175/426; 175/428; 419/18; 51/295
(58) Field of Search ...................... 175/374, 425, 175/426, 428, 434; 419/18; 75/252; 51/295

(56) References Cited

U.S. PATENT DOCUMENTS

| | | | |
|---|---|---|---|
| 4,017,480 A | 4/1977 | Baum | 428/601 |
| 4,142,888 A | 3/1979 | Rozmus | 75/201 |
| 4,255,165 A | 3/1981 | Dennis et al. | 51/309 |
| 4,341,557 A | 7/1982 | Lizenby | 75/223 |
| 4,368,788 A | 1/1983 | Drake | 175/374 |
| 4,372,404 A | 2/1983 | Drake | 175/374 |
| 4,378,975 A | 4/1983 | Tomlinson et al. | 51/309 |
| 4,398,952 A | 8/1983 | Drake | 419/18 |
| 4,428,906 A | 1/1984 | Rozmus | 419/48 |
| 4,495,073 A | 1/1985 | Dubensky et al. | 501/93 |
| 4,525,178 A | 6/1985 | Hall | 51/309 |
| 4,593,776 A * | 6/1986 | Salesky et al. | 175/375 |
| 4,604,106 A | 8/1986 | Hall et al. | 51/293 |
| 4,656,002 A | 4/1987 | Lizenby et al. | 419/10 |
| 4,673,549 A | 6/1987 | Ecer | 419/10 |
| 4,694,918 A | 9/1987 | Hall | 175/329 |
| 4,723,996 A | 2/1988 | Brunet et al. | 75/10.1 |
| 4,744,943 A | 5/1988 | Timm | 419/10 |
| 5,089,182 A | 2/1992 | Findeisen et al. | 264/8 |
| 5,096,465 A | 3/1992 | Chen et al. | 51/295 |
| 5,290,507 A | 3/1994 | Runkle | 419/14 |
| 5,304,342 A * | 4/1994 | Hall, Jr. et al. | 419/11 |
| 5,326,380 A | 7/1994 | Yao et al. | 51/293 |
| 5,370,195 A | 12/1994 | Keshavan et al. | 175/420.2 |
| 5,453,105 A | 9/1995 | Middlemiss et al. | 51/307 |
| 5,880,382 A | 3/1999 | Fang et al. | 75/236 |
| 6,102,140 A * | 8/2000 | Boyce et al. | 175/374 |

FOREIGN PATENT DOCUMENTS

| | | |
|---|---|---|
| EP | 0052922 | 6/1982 |
| EP | 0 774 527 | 5/1997 |
| GB | 1574615 | 9/1980 |
| GB | 2239028 | 6/1991 |
| GB | 2 286 599 | 8/1995 |
| JP | 62-274034 | 11/1987 |
| JP | 8-49037 | 2/1996 |
| WO | 81/03295 | 11/1981 |
| WO | 96 36465 | 11/1996 |

* cited by examiner

Primary Examiner—David Bagnell
Assistant Examiner—Zakiya Walker
(74) Attorney, Agent, or Firm—Christie, Parker & Hale, LLP

(57) ABSTRACT

Polycrystalline diamond (PCD) carbide composites of this invention have a microstructure comprising a plurality of granules formed from PCD, polycrystalline cubic boron nitride, or mixture thereof, that are distributed within a substantially continuous second matrix region that substantially surrounds the granules and that is formed from a cermet material. In an example embodiment, the granules are polycrystalline diamond and the cermet material is cemented tungsten carbide. PCD carbide composites of this invention display improved properties of fracture toughness and chipping resistance, without substantially compromising wear resistance, when compared to conventional pure PCD materials.

25 Claims, 5 Drawing Sheets

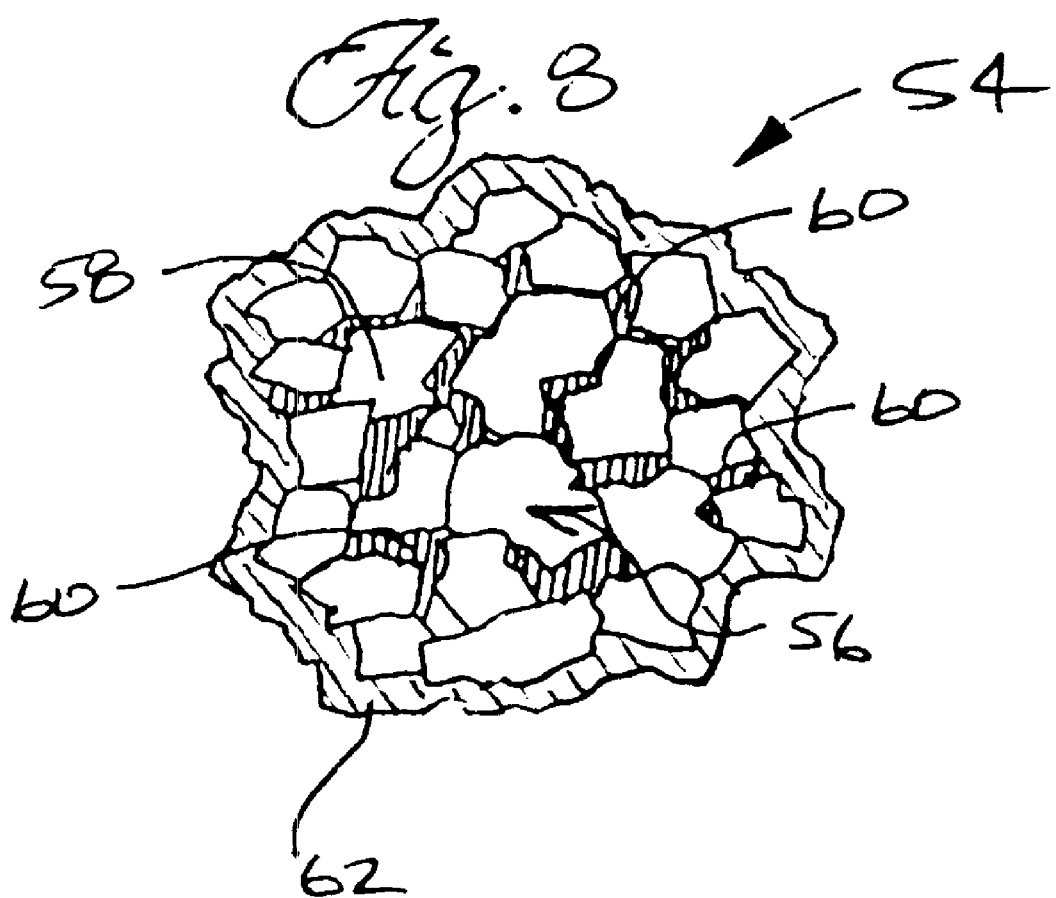

POLYCRYSTALLINE DIAMOND CARBIDE COMPOSITES

FIELD OF THE INVENTION

This invention relates to polycrystalline diamond materials and methods of making the same and, more particularly this invention relates to polycrystalline diamond carbide composites having improved properties of toughness without sacrificing wear resistance when compared to conventional polycrystalline diamond materials.

BACKGROUND OF THE INVENTION

Polycrystalline diamond (PCD) materials known in the art are formed from diamond grains or crystals and a ductile metal binder and are synthesized by high temperature/high pressure processes. Such material is well known for its mechanical properties of wear resistance, making it a popular material choice for use in such industrial applications as cutting tools for machining, and subterranean mining and drilling where such mechanical properties are highly desired. For example, conventional PCD can be provided in the form of surface coatings on, e.g., inserts used with cutting and drilling tools, to impart improved wear resistance thereto.

Traditionally, PCD inserts used in such applications are formed by coating a carbide substrate with one layer of PCD and one or two transition layers. Such inserts comprise a substrate, a surface layer, and often a transition layer to improve the bonding between the exposed layer and the support layer. The substrate is, most preferably, a carbide substrate, e.g., cemented carbide, tungsten carbide (WC) cemented with cobalt (WC—Co).

The coated layer or layers of PCD conventionally may comprise a metal binder up to about 30 percent by weight to facilitate diamond intercrystalline bonding and bonding of the layers to each other and to the underlying substrate. Metals employed as the binder are often selected from cobalt, iron, or nickel and/or mixtures or alloys thereof and can include metals such as manganese, tantalum, chromium and/or mixtures or alloys thereof. However, while higher metal binder content typically increases the toughness of the resulting PCD material, higher metal content also decreases the PCD material hardness, thus limiting the flexibility of being able to provide PCD coatings having desired levels of both hardness and toughness. Additionally, when variables are selected to increase the hardness of the PCD material, typically brittleness also increases, thereby reducing the toughness of the PCD material.

Generally, such conventional PCD materials exhibit extremely high hardness, high modulus, and high compressive strength, and provide a high degree of wear protection to a cutting or drilling element. However, in more complex wear environments known to cause impact and fretting fatigue, layers formed from conventional PCD can fail by gross chipping and spalling. For example, drilling inserts coated with a thick PCD monolayer may exhibit brittleness that causes substantial problems in practical applications. Conventional methods of improving the performance of PCD layers include optimizing grain size and controlling cobalt content to increase toughness, but the effect of these methods is limited.

Cemented tungsten carbide (WC—Co), on the other hand, is a cermet material that is well known for its mechanical properties of hardness, toughness and wear resistance, making it a popular material of choice for use in such industrial applications as subterranean mining and drilling. Cermet materials refer to materials that contain both a ceramic and a metallic element. Popular cermet materials includes those comprising hard grains formed from a carbide, boride, nitride, or carbonitride compound that includes a refractory metal such as W, Ti, Mo, Nb, V, Hf, Ta, Cr, and that comprises a further metallic cementing or binding agent. Cemented tungsten carbide is a well known cermet. Because of the above-described desired properties, cemented tungsten carbide has been the dominant material used, inter alia, in cutting tool applications for machining, and in subterranean drilling applications such as hard facing, wear inserts, and cutting inserts in rotary cone rock bits, and substrate bodies for drag bit shear cutters.

The mechanical properties associated with cemented tungsten carbide and other cermets, especially the unique combination of hardness toughness and wear resistance, make these materials more desirable than either metals or ceramics alone. Compared to PCD, WC—Co is known to display a significantly higher fracture toughness and chipping resistance. However, WC—Co has less wear resistance and hardness than PCD.

U.S. Pat. No. 4,525,178 discloses a composite material comprising a PCD body having cemented carbide pieces disposed therein formed by combining individual diamond crystals with pieces of precemented carbide. The so-formed PCD composite provides improved properties of impact resistance when compared to pure PCD materials, i.e., PCD materials that do not include cemented carbide. However, cutting substrates and/or working surfaces formed from such PCD composite are still known to chip and suffer other types of impact related material failures when exposed to aggressive cutting and/or drilling applications.

U.S. Pat. No. 5,370,195 discloses drill bit inserts comprising a PCD outer layer, an outer transition layer disposed onto an insert substrate, and an inner transition layer interposed between the outer transition layer and the PCD outer layer. The PCD outer layer comprises a minor volume percent of metal and a trace amount of WC or other ceramic additives. The inner and outer transition layers are essentially diamond-carbide composites. Each comprises diamond crystals (i.e., not PCD), particles of tungsten carbide, cobalt, and titanium carbonitride in different volume percentages. Although this diamond-carbide composite does provide some degree of improved impact resistance when compared to a pure PCD material, cutting substrates and/or working surfaces formed from this diamond-carbide composite are known to have greatly reduced wear resistance as compared to PCD. The transition layers are still likely to chip and suffer other types of impact related failures when exposed to aggressive cutting and/or drilling applications.

It is, therefore, desirable that a composite material be constructed that provides desired PCD properties of hardness and wear resistance with improved properties of fracture toughness and chipping resistance, as compared to conventional PCD materials, for use in aggressive cutting and/or drilling applications. It is desired that such composite material display such improved properties without adversely impacting the inherent PCD property of wear resistance. It is desired that such composite material be adapted for use in such applications as cutting tools, roller cone bits, percussion or hammer bits, drag bits and other mining, construction and machine applications, where properties of improved fracture toughness is desired.

SUMMARY OF THE INVENTION

PCD carbide composites of this invention are specifically designed to provide an improved degree of fracture toughness and chipping resistance, without substantially sacrificing wear resistance, when compared to conventional pure PCD materials. Generally speaking, PCD carbide composites of this invention have a microstructure comprising a first region made up of a plurality of granules formed from materials selected from the group consisting of polycrystalline diamond, polycrystalline cubic boron nitride, and mixtures thereof. The first region granules are distributed within a substantially continuous second region matrix that substantially separates the first region granules from one another. The second region is a cermet materials, e.g., formed from the group materials including carbides, nitrides, carbonitrides, borides, and mixtures thereof.

In an example embodiment, the first region granules are PCD having an average granule size in the range of from about 50 to 1,000 micrometers, and preferably within the range of from about 100 to 500 micrometers. In the same example embodiment, the second region cermet has a carbide hard grain phase and a ductile metal binder phase, wherein the carbide hard grain phase is selected from the group of carbides comprising W, Ti, Mo, Nb, V, Hf, Ta, and mixtures thereof. The second region ductile metal binder phase is selected from the group consisting of Co, Ni, Fe, alloys thereof, and alloys with materials selected from the group consisting of C, B, Cr, Si, and Mn. In an preferred example embodiment, the second region cermet is cemented tungsten carbide (WC—Co).

PCD carbide composites of this invention comprise in the range of from 10 to 90 percent by volume first region materials, and preferably comprise in the range of from about 30 to 80 percent by volume first region materials, based on the total volume of the composite.

PCD carbide composites of this invention are prepared by combining powder selected from the group consisting of carbides, nitrides, carbonitrides, borides, and mixtures thereof, with a ductile metal powder, and powder selected from the group consisting of diamond, cubic boron nitride, and mixtures thereof, to form a mixture. The mixture of powders is then pressurized under elevated temperature conditions to form the PCD composite.

PCD carbide composites of this invention, having improved properties of fracture toughness and chipping resistance, are more durable and provide a longer service life than conventional PCD materials when used in applications that are subjected to extreme abrasion and impact conditions. For example, PCD carbide composites of this invention are well suited for use in such applications as roller cone drill bits, percussion or hammer bits, drag bits, and other applications such as mining and construction tools where the combined properties of wear resistance, hardness, fracture toughness, and chipping resistance is desired.

DESCRIPTION OF THE DRAWINGS

These and other features and advantages of the present invention will become appreciated as the same becomes better understood with reference to the specification, claims and drawings wherein:

FIG. 8 is a schematic photomicrograph of a polycrystalline diamond granule prepared from a granulated coated diamond particle.

DETAILED DESCRIPTION

As used in this specification, the term polycrystalline diamond, along with its abbreviation "PCD," refers to the material produced by subjecting individual diamond crystals or grains and additives to sufficiently high pressure and high temperature that intercrystalline bonding occurs between adjacent diamond crystals. A characteristic of PCD is that the diamond crystals be bonded to each other to form a rigid body. Metallic additives such as cobalt are used to fill the voids in between the diamond crystals. Higher metal content usually improves impact resistance. PCD may also contain other additives such as WC or other carbides or nitrides. Polycrystalline diamond (PCD) carbide composites of this invention generally comprise a first hard region in the form of PCD granules, surrounded by a continuous second region matrix formed from a relatively softer and more ductile cermet material such as cemented tungsten carbide (WC—Co). PCD carbide composites of this invention provide improved properties of fracture toughness and chipping resistance when compared to conventional PCD materials, without sacrificing the inherent PCD properties of wear resistance.

Figure 1:
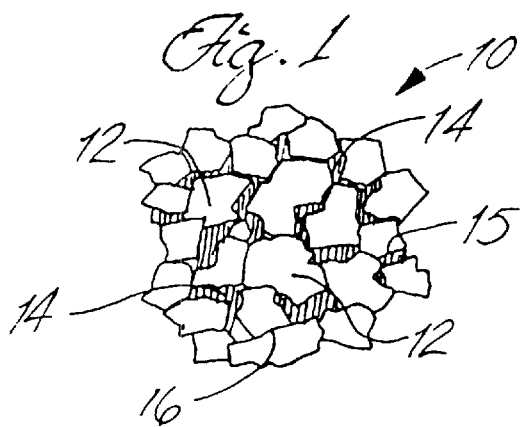
FIG. 1 is a schematic photomicrograph of a portion of a conventional polycrystalline diamond material.

FIG. 1 is a microstructure of a conventional PCD material 10 comprising diamond grains 12 that are bonded to one another by a binder material 14, e.g., cobalt. Desired properties of such conventional PCD materials are, for example, wear resistance, high modulus, and high compressive strength. Such conventional PCD materials may comprise a binder material or metal content up to about 30 percent by weight, and the metals employed as the binder can include Co, Ni, Fe, and mixtures thereof. The particular amount of the metal component that is used is typically controlled to provide a compromise between such properties as toughness and hardness.

For conventional PCD materials, the properties of toughness and hardness are inversely related to one another and are dependent on the relative amount of metal and diamond grains used to form the material. The presence of diamond grains and related diamond bonding is necessary to provide properties of high strength and wear resistance to the material. However, too much diamond grains or diamond bonding in the material will produce an undesired level of chipping resistance. The presence of metal in the PCD material can help to improve chipping resistance but adversely impact the PCD material properties of high strength and wear resistance. Therefore, the amount of metal that is used to form the PCD material is preferably that amount that provides a desired improvement in chipping resistance without significantly impacting strength and wear resistance. The compromise in these mechanical properties makes conventional PCD unsuited for use in certain demanding applications that call for a high degree of chipping resistance, strength, and wear resistance.

Referring still to FIG. 1, it is evident that the binder material 14 is not continuous throughout the microstructure in the conventional PCD material. Rather, the microstructure of the conventional PCD material has a uniform distribution of cobalt binder among the PCD granules. Thus, crack propagation through the conventional PCD material will often travel through the less ductile and brittle diamond grains, either transgranularly through diamond grain/cobalt interfaces 15, or intergranularly through the diamond grain/diamond grain interfaces 16. As a result, conventional PCD materials often exhibit gross brittle fracture during more demanding applications, which may lead to catastrophic material and part failure.

Figure 2:
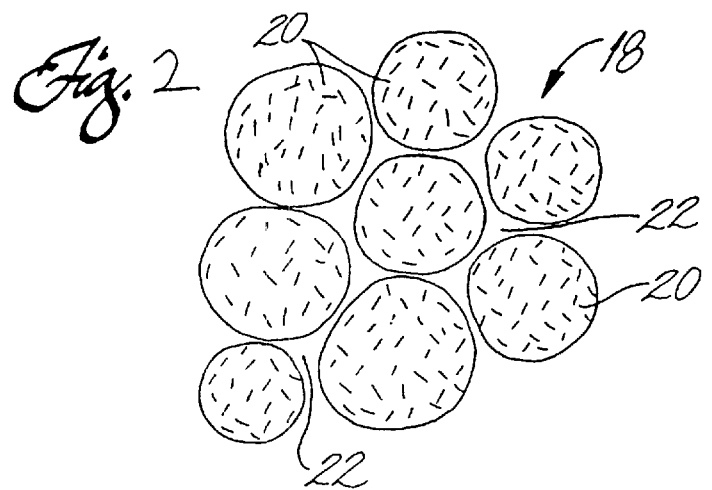
FIG. 2 is a schematic photomicrograph of a portion of a polycrystalline diamond carbide composite prepared according to principles of this invention.

FIG. 2 illustrates a microstructure of a PCD carbide composite 18, prepared according to principles of this invention, having a microstructure comprising a first hard region 20 dispersed within a second relatively softer and substantially continuous matrix region 22. The first region 20 is formed from granules of a hard material selected from the group consisting of PCD, polycrystalline cubic boron nitride (PCBN), and mixtures thereof. In an example embodiment, the first region 20 comprises PCD granules. As discussed in greater detail below, the PCD granules can either be provided in pre-sintered form as diamond granules prepared from synthetic diamond powder having a desired content of binder metal, e.g., cobalt, or as granulated diamond particles prepared by granulating a diamond powder, binder metal and organic binding agent precursor, and then coating the granulated diamond precursor with a desired metal or cermet. Alternatively, the granulated diamond precursor can be used without further coating.

In an example embodiment, where the PCD granules are formed from synthetic diamond powder and binder metal, the first region comprises PCD granules having diamond grains that range from submicrometer in size to 50 micrometers, and a binder metal, e.g., cobalt, present in the range of from about 10 to 20 percent by weight of the total PCD granule. In another example embodiment, where the PCD granules are formed from coated granulated diamond precursor, the first region comprises PCD granules having diamond grains sized in the range of from 1 to 50 micrometers, and a binder metal, e.g., cobalt, present up to about 30 percent by weight of the total PCD granule.

In a first example, the PCD granules can be prepared by blending synthetic diamond powder with a polymer binder, and pelletizing the diamond and polymer mix into small diamond pellets or granules. If desired, the so-formed diamond granules can be further coated with a metal or cermet material. The so-formed diamond granules can have equi-axe shapes, e.g., are in the form of polygons or spheres, or can be in the form of short fibers. It is to be understood that the diamond granules useful for forming PCD composites of this invention can have a variety of different shapes and configurations, e.g., elongated plates, discs, short fibers, or the like, which may or may not be useful for providing a desired performance characteristic. For example, diamond granules of this invention can be configured to provide particular crack propagation characteristics within the composite. Each of the diamond granules comprise a plurality of diamond grains and a minor amount of binder metal such as cobalt.

The polymer binders useful for forming diamond granules can include thermoplastic materials, thermoset materials, aqueous and gelation polymers, as well as inorganic binders. Suitable thermoplastic polymers include polyolefins such as polyethylene, polyethylene-butyl acetate (PEBA), ethylene vinyl acetate (EVA), ethylene ethyl acetate (EEA), polyethylene glycol (PEG), polysaccharides, polypropylene (PP), poly vinyl alcohol (PVA), polystyrene (PS), polymethyl methacrylate, poly ethylene carbonate (PEC), polyalkylene carbonate (PAC), polycarbonate, poly propylene carbonate (PPC), nylons, polyvinyl chlorides, polybutenes, polyesters, waxes, fatty acids (stearic acid), natural and synthetic oils (heavy mineral oil), and mixtures thereof.

Suitable thermoset plastics useful as the presintered PCD granule polymer binder include polystyrenes, nylons, phenolics, polyolefins, polyesters, polyurethanes. Suitable aqueous and gelation systems include those formed from cellulose, alginates, polyvinyl alcohol, polyethylene glycol, polysaccharides, water, and mixtures thereof. Silicone is an example inorganic polymer binder.

An exemplary diamond granule polymer binder is ethylene vinyl acetate and heavy mineral oil, which is preferred because of its ability to be extruded and pultruded in fine fibers. In addition, the backbone (EVA) is insoluble in heptane and alcohol.

In a second example, the PCD granules are prepared by taking a diamond precursor material (formed from diamond powder, an organic binder, and binder metal), granulating the diamond precursor material, and coating the granulated diamond with a desired metal. Suitable diamond precursor materials include diamond tape that is formed by combining synthetic diamond powder with a binder material, e.g., cobalt, and an organic binder, and forming the combined mixture into a desired sheet or web. Diamond powder and binder metal powder can be the same as that described above for forming PCD granules according to the first example. Suitable organic binders include the same types of polymer binders described above.

The diamond precursor is granulated into desired size particles, e.g., a diamond precursor in the form of diamond tape is chopped into small particles, wherein each particle comprises a combination of diamond powder, metal binder powder, and organic binder. The so-formed granulated diamond particles are then coated with a desired cermet or metal material by conventional process such as by ball milling and the like. The granulated diamond particles can be coated with a ductile metal binder material such as that selected from the group including Co, Fe, Ni, and combinations thereof, or can be coated with a cermet material that includes hard grains of carbides, nitrides, carbonitrides or borides or a mixture thereof formed from refractory metals such as W, Ti, Mo, Nb, V, Hf, Ta, Cr, and that may further include a metallic cementing agent. Alternatively, the granulated diamond particles can be used to form PCD granules of this invention without further coating is so desired.

PCD granules prepared from granulated diamond particles have a microstructure that is different from that of PCD granules prepared from synthetic diamond powder. FIG. 8 illustrates a PCD granule 54 prepared from a granulated and coated diamond particle that comprises a diamond cell 56 that itself comprises a plurality of diamond grains 58 and binder metal 60 interposed between the diamond grains. The diamond cell 56 is substantially surrounded, i.e., in three dimensions, by a metal or cermet material 62. In an example embodiment, so-formed PCD granules each comprise a plurality of such diamond cells that are separated from one another by a cell boundary formed from the metal or cermet material. In a preferred example, each cell boundary is formed from WC—Co. On the other hand, PCD granules prepared from synthetic diamond powder have a microstructure lacking the diamond cells and cell boundaries, only comprising diamond grains and binder metal interposed therebetween (see FIG. 1).

A PCD granule microstructure comprising diamond cells that are substantially surrounded by a WC—Co cell boundary, for example, can provide improved properties of fracture toughness to PCD carbide composites of this invention because the cell boundary can function to deflect crack propagation away from the diamond cell.

PCD carbide composites of this invention include PCD granules having an average post-sintered granule diameter in the range of from about 50 to 1,000 micrometers. The size of the PCD granules will depend on the particular PCD carbide composite application that is anticipated, as the PCD granule size can influence such composite mechanical properties as fracture toughness, chipping resistance, and wear resistance. Generally, the use of larger PCD granules can produce a composite having good wear resistance but poor chipping resistance, while the use of smaller PCD granules may provide a composite having reduced fracture toughness.

A preferred PCD granule size is in the range of from about 100 to 500 micrometers. Within this preferred size range, PCD granules possess all bulk mechanical properties of polycrystalline diamond materials such as extremely high wear resistance and high strength. However, PCD materials are still prone to chipping due to the inherent PCD property of brittleness. PCD granules sized greater than about 500 micrometers can produce a composite that is more likely to cause macro chipping and spalling of the entire composite in response to surface chips, PCD granules sized less than about 100 micrometers may not have the mass properties and robustness that is needed to provide a desired degree of wear resistance in extremely abrasive and highly-loaded environments. The smaller particles are also prone to be up-rooted or displaced when preferential wear occurs to the surrounding matrix.

The second region 22 is formed from a cermet material that includes hard grains of carbides, nitrides, carbonitrides or borides or a mixture thereof formed from refractory metals such as W, Ti, Mo, Nb, V, Hf, Ta, Cr, and that further includes a metallic cementing agent. Example hard grain materials include WC, TiC, TiN, TiCN, TaC, $TiB_2$, or $Cr_2C_3$. The metallic cementing agent may be selected from the group of ductile materials including one or a combination of Co, Ni, Fe, which may be alloyed with each other or with C, B, Cr, Si and Mn. Preferred cermets useful for forming the second region 22 include cemented tungsten carbide with cobalt as the binder phase (WC—Co), and other cermets such as WC—Ni, WC—Fe, WC—(Co, Ni, Fe) and alloys thereof.

Cemented tungsten carbide, useful for forming the second region 22 of PCD carbide composites of this invention, can comprise in the range of from about 75 to 97 percent by weight carbide component, and metallic cementing agent or binder in the range of from about 3 to 25 percent by weight based on the total weight of the cermet. As described below, the carbide component and binder component used to form the second region cermet material are provided in powder form and mixed with the presintered PCD granules, and then subjected to high-temperature, high-pressure processing to form the PCD composite. If desired, the second region 22 can comprise a percentage of spherical cast carbide, e.g., spherical cast carbide fabricated using the spinning disk rapid solidification process described in U.S. Pat. Nos. 4,723,996 and 5,089,182.

The respective amount, e.g., volume fraction, of the first and second regions 20 and 22 making up PCD carbide composites of this invention determine the combined mechanical and tribological behavior of the final composites so formed. PCD carbide composites of this invention may comprise in the range of from about 10 to 90 percent by volume of the first region granules 20, and preferably from about 30 to 80 percent by volume of the first region, based on the total volume of the composite. The volume fraction of the first region granules is one of the most important factors affecting the mechanical properties of the final composite.

Using less than about 30 percent by volume of the first region granules is not desired as such is an ineffective amount of PCD necessary to provide a desired level of wear resistance for demanding applications such as shear cutter substrates for drag bits or inserts for roller cone rock bits. Using greater than about 80 percent by volume of the first region granules may not be desired for certain demanding applications because it: (1) increases the contiguity between PCD granules to a level causing macro chipping and reducing impact and spalling resistance (wherein contiguity measures the degree of granule to granule contact, and the greater the degree of contiguity the higher the number of contacts between PCD granules); and (2) reduces the amount of the second region material present in the composite to an ineffective amount necessary to provide desired mechanical properties of fracture toughness and chipping resistance for the same types of demanding applications.

The exact amount of the first region granules 20 that are used to form PCD carbide composites of this invention will vary depending on the desired mechanical properties for a particular application. For example, when the composite comprises PCD as the first region material and WC—Co as the second region material, and is used as a wear or cutting surface on an earth boring drill bit, it is preferred that the first region material be present in the range of from about 40 to 60 percent by volume of the total volume of the composite.

Broadly speaking, PCD carbide composites of this invention are made by mingling PCD or PCBN hard granules with a relatively softer and tougher cermet matrix under conditions that cause the hard granules to form a strong bond with the cermet matrix. PCD carbide composites of this invention have a microstructure that provides a much higher fracture toughness and chipping resistance than conventional 100 percent PCD materials due to the enhanced crack blunting and deflective effects of the continuous cermet second region 22 that surrounds each first region granule 20. The continuous second region increases the overall fracture toughness of the composite, by blunting or deflecting the front of a propagating crack if one occurs, without sacrificing the wear resistance of the composite.

PCD carbide composites of this invention are initially formed from green parts that can be sintered by high-temperature high-pressure process, which results in the desired composite microstructure of a uniform distribution of PCD granules within the relatively softer and tougher cermet matrix, thereby producing improved properties of fracture toughness without sacrificing wear resistance.

Initially, the hard region PCD or PCBN granules are formed by the method described above comprising combining synthetic diamond powder with a suitable polymer binder, and pelletizing the mixture to form the green, i.e., presintered, diamond granules.

The second region cermet, e.g., WC—Co, is formed by either combining WC powder with Co powder and a polymer binder, or by combining WC—Co powder with a polymer binder, to form a slurry. A solvent can optionally be used to prepare the slurry to help control the its viscosity for processing. Suitable WC, WC—Co, and/or Co powders useful for forming the second region includes those having an average particle size of less than about 100 micrometers, and preferably less than about 30 micrometers. It is desired that the amount of Co used to form the second region be in the range of from about 3 to 30 percent by weight based on the total weight of the WC and Co components.

The polymer binder used to form the slurry can be the same as or different from that used to form the diamond granules. It may be desired to use different polymer binders so that the diamond granules remain intact when they are combined with the slurry. Suitable solvents include heptane, methyl-ethyl ketone, methyl chloride, toluene, water, alcohol, acetone, mineral spirits, and mixtures thereof. In a preferred embodiment, the polymer binder is polyethylene-butyl acetate, which exhibits excellent formability at temperature and is soluble in heptane and alcohol.

The slurry comprises in the range of from about 40 to 90 percent by weight powder, in the range of from about 1 to 20 percent by weight polymer binder, and up to about 60 percent by weight solvent based on the total weight of the slurry. The provided ranges for these ingredients are important to both aid in processing the slurry before sintering, and to prevent unwanted cracking during heating.

The diamond granules are thoroughly mixed with the WC and Co powder slurry, and any solvent is extracted and collected for recycling. Alternatively, at this stage sintered PCD granules can be used if it cost effective. The diamond granules (or sintered PCD granules), WC, and Co mixture are then formed by shaping into sheets, plates, rods, or any other desired planar or nonplanar shape as green stock, e.g., in the shape of a cap for a rock bit insert. The green parts are thermally debinded and then sintered by high-temperature, high-pressure process for diamond synthesis. The sintered product is the PCD carbide composite of this invention having a microstructure comprising PCD granules embedded in one substantially continuous WC—Co matrix.

PCD carbide composite constructions of this invention will become better understood and appreciated with reference to the following examples:

EXAMPLE NO. 1

PCD Carbide Composite Comprising PCD Granules Formed from Synthetic Diamond Powder, Metal Powder, and Polymeric Binder Diamond granules for forming the first region of the PCD carbide composite were made according to the mixing and pelletizing steps described, from grade 817 synthetic diamond powder available from MegaDiamond of Provo, Utah. The so-formed diamond granules had an average presintered granule size of from 300 to 400 micrometers. The polymer binder that was used to form the diamond granules was ethylene vinyl acetate. The second region was formed from WC—Co powder taken from TCM grades 411, 510, 614, or 616, available from Kennametal of Latrobe, Pa. The polymer binder used to form the WC and Co slurry was polyethylene-butyl acetate.

The diamond granules and WC and Co slurry were combined and a green part was formed from the mixture. The green part was thermally debinded at from 200 to 400° C. The thermally debinded green part was sintered by high-temperature, high-pressure process at approximately 1,400° C. and approximately 55 megapascals for approximately 120 seconds. The volume fraction of PCD granules in the post-sintered composite was in the range of from 70 to 80 percent.

EXAMPLE NO. 2

PCD Carbide Composite Comprising PCD Granules Formed from Granulated and Coated Diamond Particles Diamond granules for forming the first region of the PCD carbide composite were made by from diamond tape comprising synthetic diamond powder and an organic binder. A small amount of binder metal, e.g., cobalt, was either present in the synthetic diamond powder or was added as a separate metal powder. The diamond tape was chopped or granulated into a desired size, e.g., cubes, and was introduced into a ball mill containing WC—Co balls. Alternatively, the granulated diamond tape could be milled with a WC media in a polypropylene bottle. The milled granulated diamond particles were within the range of from 50 to 1000 micrometers in size. The granulated diamond particles and WC and Co slurry were combined and a green part was formed from the mixture. The green part was thermally debinded at from 200 to 400° C. The thermally debinded green part was sintered by high-temperature, high-pressure process at approximately 1,400° C. and approximately 55 megapascals for approximately 120 seconds. The volume fraction of PCD granules in the post-sintered composite was in the range of from 70 to 80 percent.

PCD carbide composites of this invention display improved physical properties of fracture toughness and chipping resistance, without sacrificing wear resistance, when compared to conventional pure PCD materials, which result is due to the special architecture of the microstructure, comprising the hard first region granules that act to control the wear rate of the composite, surrounded by the tougher continuous second region matrix that provides a crack blunting and crack interruption, i.e., a fracture energy absorbing, effect.

PCD carbide composites of this invention can be used in a number of different applications, such as tools for machining, cutting, mining and construction applications, where mechanical properties of high fracture toughness and wear resistance are highly desired. PCD carbide composites of this invention can be used to form wear and cutting components in such tools as roller cone bits, percussion or hammer bits, drag bits, and a number of different cutting and machine tools. PCD carbide composites can be used to form a wear surface in such applications in the form of one or more substrate coating layers, or can be used to form the substrate itself. An advantage of PCD carbide composites of this invention that are used in the form of a surface coating is that, when disposed over a cemented tungsten carbide substrate, the composite will display a reduced level of residual stress due to the relative mechanical and thermal matching between the composite and the substrate when compared to a coating of pure PCD.

Figure 3:
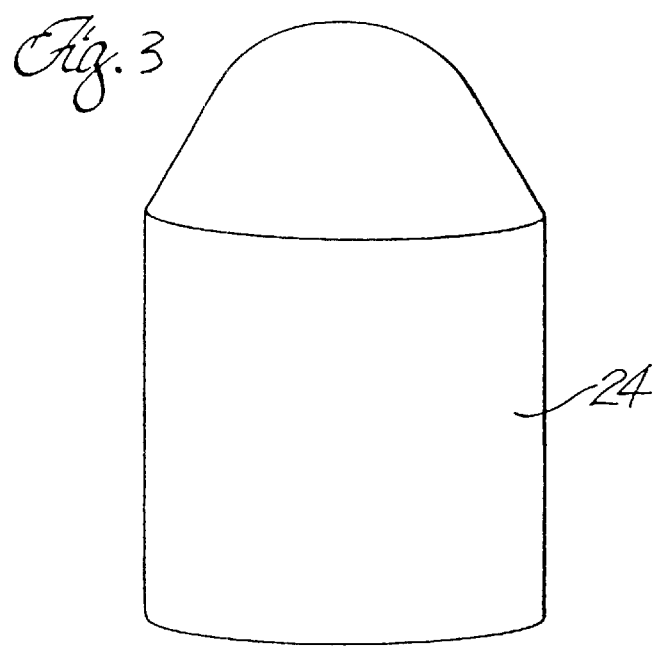
FIG. 3 is a schematic perspective side view of an insert comprising a polycrystalline diamond composite of this invention.
Figure 4:
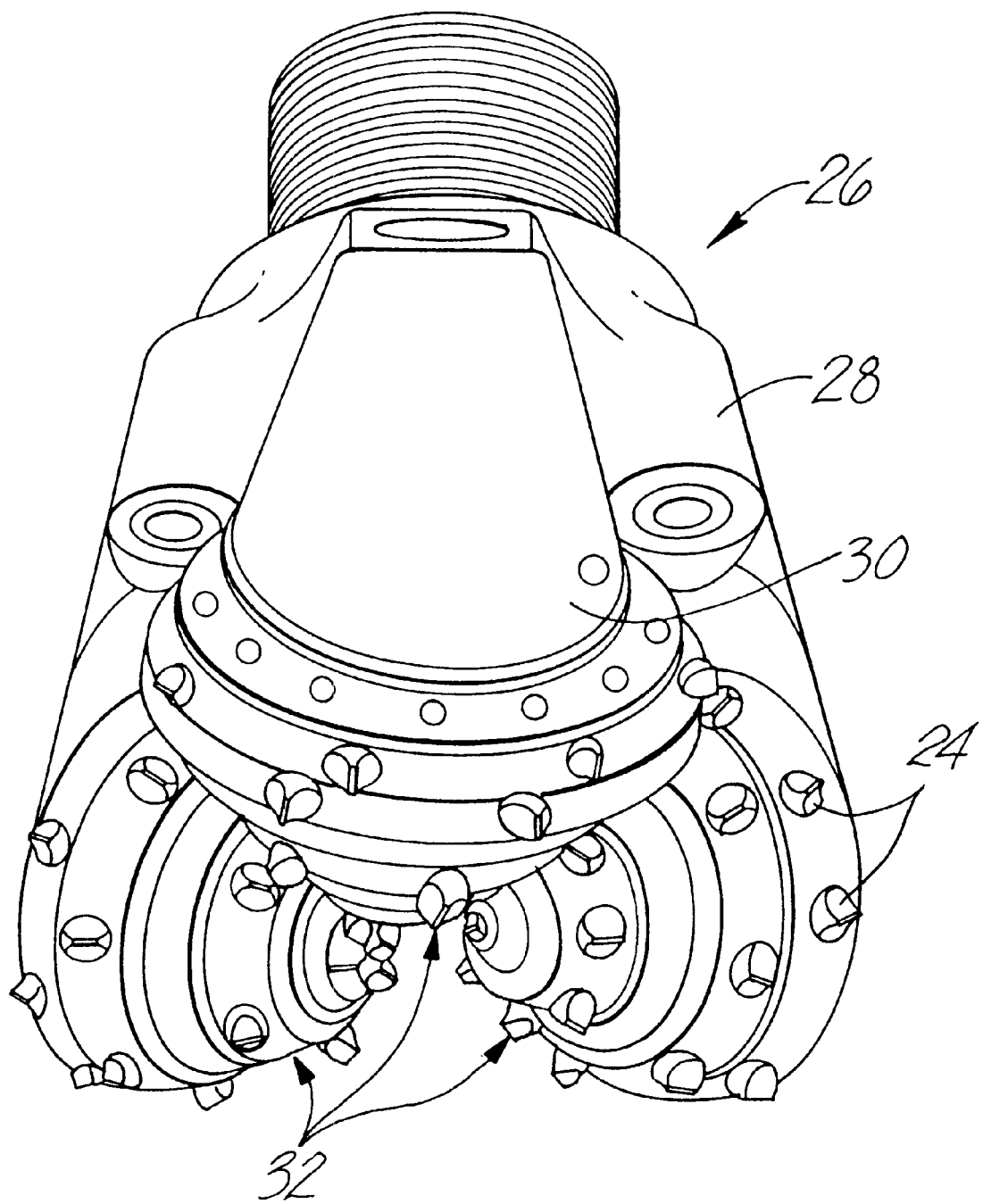
FIG. 4 is a perspective side view of a roller cone drill bit comprising a number of the inserts of FIG. 3.

FIG. 3, for example, illustrates a mining or drill bit insert 24 that is either formed from or is coated with a PCD carbide composite. Referring to FIG. 4, such an insert 24 can be used with a roller cone drill bit 26 comprising a body 28 having three legs 30, and a cutter cone 32 mounted on a lower end of each leg. Each roller cone bit insert 24 can be fabricated according to one of the methods described above. The inserts 24 are provided in the surfaces of the cutter cone 32 for bearing on a rock formation being drilled.

Figure 5:
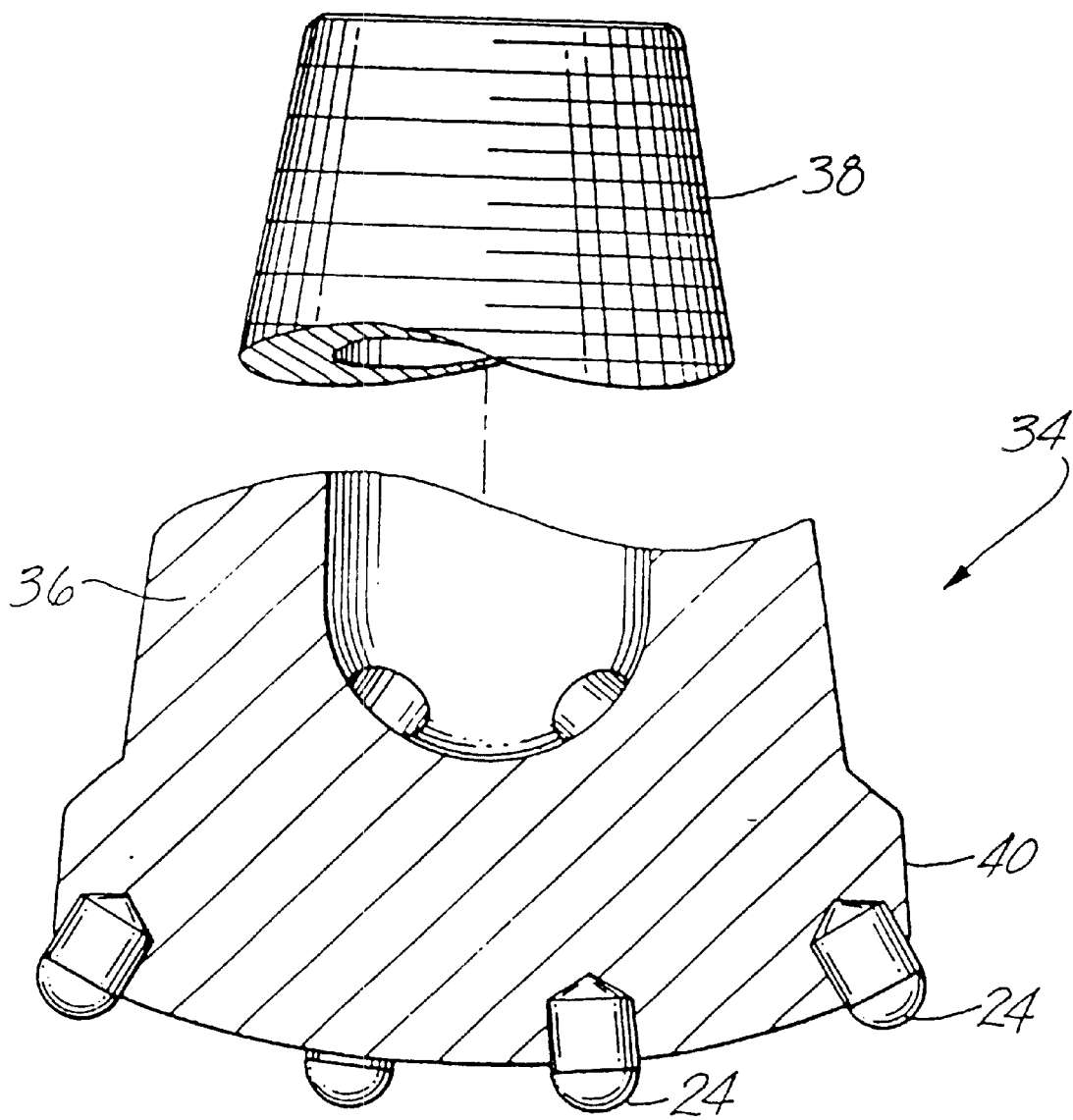
FIG. 5 is a perspective side view of a percussion or hammer bit comprising a number of inserts comprising a polycrystalline diamond carbide composite of this invention.

Referring to FIG. 5, inserts 24 formed from PCD carbide composites of this invention can also be used with a percussion or hammer bit 34, comprising a hollow steel body 36 having a threaded pin 38 on an end of the body for assembling the bit onto a drill string (not shown) for drilling oil wells and the like. A plurality of the inserts 24 are provided in the surface of a head 40 of the body 36 for bearing on the subterranean formation being drilled.

Figure 6:
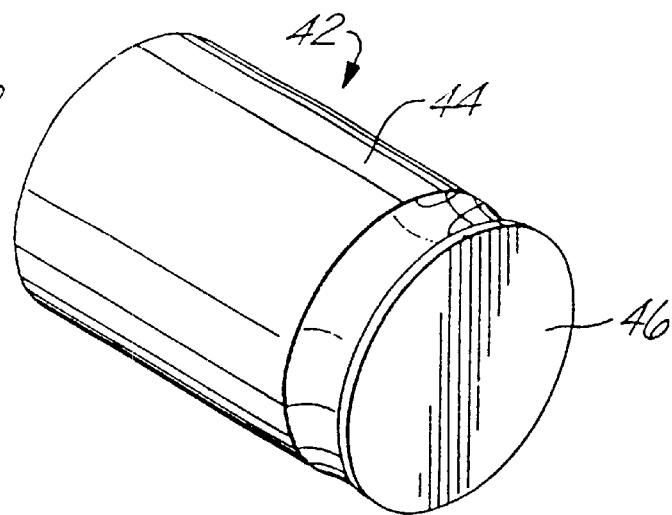
FIG. 6 is a schematic perspective side view of a shear cutter comprising a polycrystalline diamond carbide composite of this invention.
Figure 7:
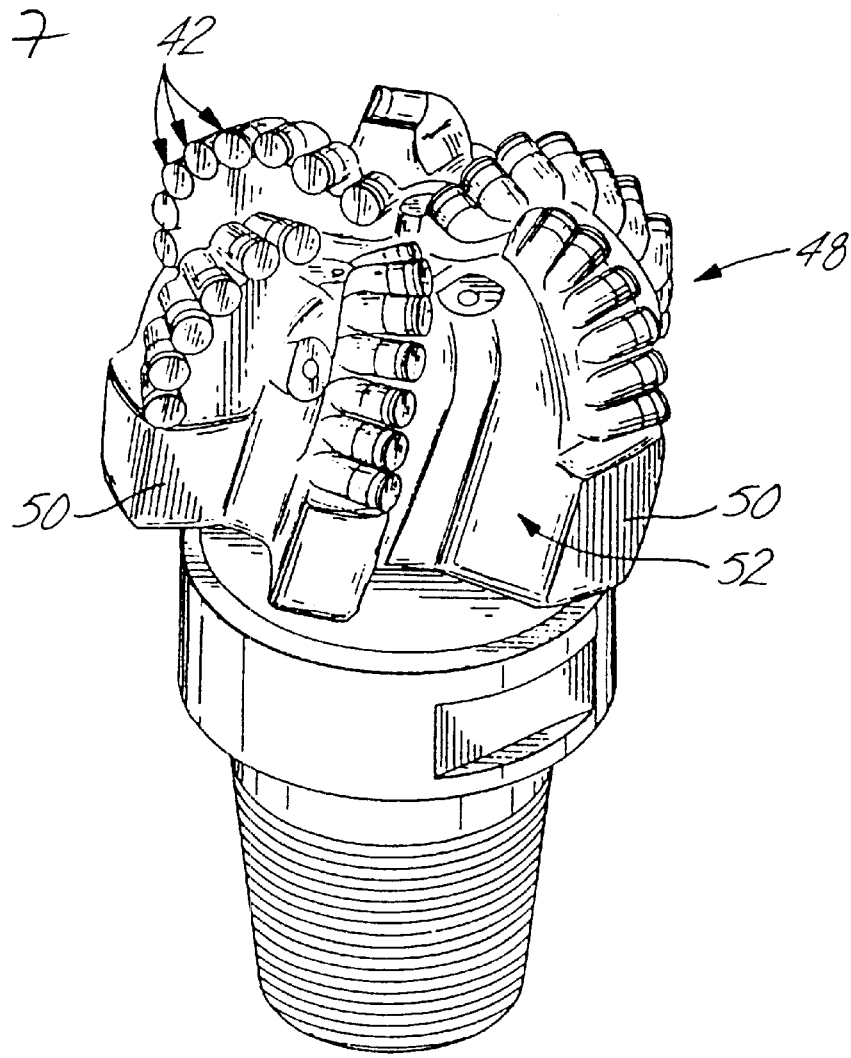
FIG. 7 is a perspective side view of a drag bit comprising a number of the shear cutters of FIG. 6.

Referring to FIG. 6, PCD carbide composites of this invention can also be used to form PCD shear cutters 42 that are used, for example, with a drag bit for drilling subterranean formations. More specifically, PCD carbide composites of this invention can be used to form a sintered surface layer on a cutting or wear surface of the shear cutter substrate 44. Referring to FIG. 7, a drag bit 48 comprises a plurality of such PCD shear cutters 42 that are each attached to blades 50 that extend from a head 52 of the drag bit for cutting against the subterranean formation being drilled.

Although, limited embodiments of PCD carbide composites and applications for the same, have been described and illustrated herein, many modifications and variations will be apparent to those skilled in the art. For example, while PCD carbide composites of this invention have been described as being useful to form a working surface on a particular substrate, it is to be understood within the scope of this invention that PCD carbide composites of this invention can also be used to form multiple layer structure, or to form the substrate itself, e.g., a shear cutter.

Accordingly, it is to be understood that within the scope of the appended claims, PCD carbide composites of this invention may be embodied other than as specifically described herein.

What is claimed is:

1. A composite material having a microstructure comprising:
    a plurality of first regions substantially dispersed within a continuous matrix second region, the first regions being in the form of granules each having an inner portion formed from a material selected from the group consisting of polycrystalline diamond, polycrystalline cubic boron nitride, and mixtures thereof, and a surrounding outer portion formed from a material having a degree of ductility that is greater than that of the inner portion, the continuous matrix second region being formed from a material having a degree of ductility that is greater than that of the granule inner portion.

2. The composite material as recited in claim 1 wherein the granule inner portion is formed from polycrystalline diamond, and the granules have an average granule size in the range of from 50 to 1,000 micrometers.

3. The composite material as recited in claim 2 wherein the granules have an average granule size in the range of from about 100 to 500 micrometers.

4. The composite material as recited in claim 1 wherein the continuous matrix second region comprises a hard grain phase and a ductile metal binder phase, wherein the hard grain phase is a carbide compound selected from the group consisting of W, Ti, Mo, Nb, V, Hf, Ta, and Cr.

5. The composite material as recited in claim 4 wherein the ductile metal binder phase is selected from the group consisting of Co, Ni, Fe, alloys thereof, and alloys with materials selected from the group consisting of C, B. Cr, Si, and Mn.

6. The composite material as recited in claim 1 wherein the continuous matrix second region is cemented tungsten carbide.

7. The composite material as recited in claim 1 comprising in the range of from about 30 to 80 percent by volume granules based on the total volume of the composite material.

8. The composite material as recited in claim 1 wherein the granule inner portion is polycrystalline diamond, and the continuous matrix second region is cemented tungsten carbide.

9. The composite material as recited in claim 8 wherein the granule outer portion is cemented tungsten carbide.

10. The composite material as recited in claim 1 wherein the granule inner portion is polycrystalline diamond formed from granulated diamond particles, and the granule outer portion is formed from a material selected from the group consisting of metals and cermets.

11. An insert for use in roller cone and percussion drill bits comprising a surface formed from the composite material of claim 1.

12. A polycrystalline diamond shear cutter comprising a cutting surface formed from the composite material of claim 1.

13. A roller cone drill bit comprising:
    a body having a number of legs that extend therefrom;
    cutting cones rotatably disposed on an end of each leg;
    a plurality of cutting inserts disposed in the cutting cones, wherein at least a portion of the cutting inserts are formed from a composite material having a microstructure comprising a plurality of granules distributed within a substantially continuous matrix, each granule having a core portion made from a material selected from the group consisting of polycrystalline diamond, polycrystalline cubic boron nitride, and mixtures thereof, and a surrounding shell portion formed from a material having a degree of ductility greater than that of the core portion, the continuous matrix being formed from a material having a greater degree of ductility than that used to form the granule core portion.

14. The drill bit as recited in claim 13 wherein the granule core portion is formed from polycrystalline diamond, and the granules have an average granule size in the range of from 100 to 500 micrometers.

15. The drill bit as recited in claim 14 wherein the continuous matrix is cemented tungsten carbide.

16. The drill bit as recited in claim 13 wherein the continues matrix is a carbide compound comprising a hard grain phase and a ductile binder phase, wherein the hard grain phase comprises a carbide selected from the group consisting of W, Ti, Mo, Nb, V, Hf, Ta, Cr, and mixtures thereof, and wherein the ductile binder phase comprises a ductile metal selected from the group consisting of cobalt, nickel, iron, and mixtures thereof.

17. The drill bit as recited in claim 13 wherein the composite comprises in the range of from 30 to 80 percent by volume of the granules based on the total volume of the composite material.

18. The drill bit as recited in claim 13 wherein the composite material is disposed along a working surface of the insert.

19. A percussion drill bit comprising:
    a body having a head with a surface adapted to engage a subterranean formation during drilling;
    a plurality of inserts disposed in the head surface, wherein the inserts are formed from a composite material having a microstructure comprising:
        a plurality of granules distributed within a substantially continuous matrix, the granules each comprise a core portion formed from a material selected from the group consisting of polycrystalline diamond, polycrystalline cubic boron nitride, and mixtures thereof, and a surrounding shell portion formed from a material having a degree of ductility greater than that of the core portion, the continuous matrix formed from a material having a degree of ductility greater than that of the granule core portion.

20. The drill bit as recited in claim 19 wherein the granule core portion is polycrystalline diamond and the granule shell portion is cemented tungsten carbide.

21. A drag drill bit comprising:
- a body having a head and having a number of blades extending away from a head surface, the blades being adapted to engage a subterranean formation during drilling;
- a plurality of shear cutters disposed in the blades to contact the subterranean formation during drilling, each shear cutter comprising a cutting surface formed from a composite having a microstructure comprising:
- a plurality of granules each comprising a core portion and a surrounding shell portion, the core portion being formed from a material selected from the group consisting of polycrystalline diamond, polycrystalline cubic boron nitride, and mixtures thereof, the shell portion being formed from a material having a degree of ductility greater than that of the core portion; and
- a substantially continuous matrix, wherein the plurality of granules are disposed therein, the matrix being formed from a material having a degree of ductility greater than that of the granule core portion.

22. The drill bit as recited in claim 21 wherein the granule core comprises polycrystalline diamond and the matrix is formed from cemented tungsten carbide.

23. A composite material having a microstructure comprising:
- a plurality of granules comprising a material selected from the group consisting of polycrystalline diamond, polycrystalline cubic boron nitride, and mixtures thereof; and
- a substantially continuous matrix comprising a material having a degree of ductility that is greater than that of the granules, wherein the granules are dispersed within the continuous matrix;
- wherein the composite is formed by the steps of:
  - forming green-state granules by combining a material selected from the group consisting of diamond, cubic boron nitride, and mixtures thereof, with an organic binder to form a first mixture, and processing the mixture into granules;
  - combining the green-state granules with a first powder material selected from the group consisting of carbides, nitrides, carbonitrides, borides, and mixtures thereof; and a second ductile metal powder to form a second mixture; and
  - pressurizing the second mixture under elevated temperature conditions to promote intercrystalline bonding within the granules.

24. The composite material as recited in claim 23 wherein the granules comprise:
- an inner portion formed from the group consisting of polycrystalline diamond, polycrystalline cubic boron nitride, and mixtures thereof; and
- an outer portion that surrounds the inner portion, and that is formed from a material having a degree of ductility that is greater than that of the granule inner portion.

25. The composite material as recited in claim 23 wherein the granule inner portion comprises polycrystalline diamond, the diamond outer portion comprises cemented tungsten carbide, and the substantially continuous matrix comprises cemented tungsten carbide.

* * * * *